US010586534B1

(12) United States Patent
Argyropoulos et al.

(10) Patent No.: US 10,586,534 B1
(45) Date of Patent: Mar. 10, 2020

(54) VOICE-CONTROLLED DEVICE CONTROL USING ACOUSTIC ECHO CANCELLATION STATISTICS

(71) Applicant: Amazon Technologies, Inc., Seattle, WA (US)

(72) Inventors: Paraskevas Argyropoulos, Everett, MA (US); Carlo Murgia, Santa Clara, CA (US); Ramya Gopalan, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 69 days.

(21) Appl. No.: 15/717,503

(22) Filed: Sep. 27, 2017

(51) Int. Cl.
| G10L 21/02 | (2013.01) |
| G10L 15/20 | (2006.01) |
| G10L 15/22 | (2006.01) |
| G10L 25/84 | (2013.01) |
| G10L 21/0232 | (2013.01) |
| G10L 15/30 | (2013.01) |
| G10L 15/08 | (2006.01) |
| G10L 21/0208 | (2013.01) |

(52) U.S. Cl.
CPC .............. *G10L 15/20* (2013.01); *G10L 15/08* (2013.01); *G10L 15/22* (2013.01); *G10L 15/30* (2013.01); *G10L 21/0232* (2013.01); *G10L 25/84* (2013.01); *G10L 2015/088* (2013.01); *G10L 2015/223* (2013.01); *G10L 2021/02082* (2013.01)

(58) Field of Classification Search
CPC ....................................................... G10L 21/02
See application file for complete search history.

(56) References Cited

U.S. PATENT DOCUMENTS

| 4,600,815 A * | 7/1986 | Horna ................... H04M 9/082 |
| | | 379/390.01 |
| 4,918,727 A * | 4/1990 | Rohrs ..................... H04B 3/234 |
| | | 370/290 |
| 9,338,278 B2 * | 5/2016 | Kechichian ....... H04M 1/72536 |
| 9,368,105 B1 | 6/2016 | Freed et al. |
| 9,373,338 B1 * | 6/2016 | Gopalan .................. G10L 21/02 |
| 9,548,053 B1 | 1/2017 | Basye et al. |
| 10,142,391 B1 * | 11/2018 | Brisebois ................. H04L 65/80 |
| 10,157,358 B1 * | 12/2018 | Brisebois ........... G06Q 10/1095 |
| 10,218,588 B1 * | 2/2019 | Brisebois ........... G06Q 10/1095 |
| 2007/0206779 A1 * | 9/2007 | Normile ................ H04M 9/082 |
| | | 379/406.08 |
| 2011/0044431 A1 * | 2/2011 | Klemm ............. H04M 1/72519 |
| | | 379/32.01 |

(Continued)

*Primary Examiner* — Seong-Ah A Shin
(74) *Attorney, Agent, or Firm* — K&L Gates LLP

(57) ABSTRACT

Devices and techniques are generally described for control of a voice-controlled device using acoustic echo cancellation statistics. A reference signal representing the audio stream may be sent to an acoustic echo cancellation (AEC) unit. A microphone may receive an input audio signal and send the input audio signal to the AEC unit. The AEC unit may attenuate at least a part of the input audio signal. AEC statistics related to the attenuation of at least the part of the input audio signal may be determined over a first period of time. A wake-word in the input audio signal may be detected during the first period of time. A determination may be made that the wake-word is part of the playback of the audio stream based at least in part on the AEC statistics.

19 Claims, 6 Drawing Sheets

(56) References Cited

U.S. PATENT DOCUMENTS

| | | | |
|---|---|---|---|
| 2012/0041901 A1* | 2/2012 | Zhao | G06N 5/043 706/10 |
| 2012/0288100 A1* | 11/2012 | Cho | G10L 21/0208 381/22 |
| 2013/0332113 A1* | 12/2013 | Piemonte | H04M 1/72569 702/189 |
| 2018/0174598 A1* | 6/2018 | Shabestary | H04M 9/082 |
| 2018/0226086 A1* | 8/2018 | Huang | H04R 1/406 |
| 2019/0278556 A1* | 9/2019 | Usher | G10L 15/22 |

\* cited by examiner

VOICE-CONTROLLED DEVICE CONTROL USING ACOUSTIC ECHO CANCELLATION STATISTICS

BACKGROUND

Speech recognition and/or automatic speech recognition (ASR) combined with language processing techniques may allow a user to control a computing device to perform tasks based on the user's spoken commands. Such speech recognition and voice control may be used by computers, handheld devices, telephone computer systems, home and/or personal assistant devices, and other internet-enabled devices. In various examples, speech recognition and/or voice-controlled devices may activate upon detection of a spoken "wake-word" or "wake command". Thereafter, the device may record spoken commands by the user and may send the command to one or more other devices for language processing in order to translate the recording into executable instructions. The executable instructions may be executed and some task may be performed in response to the execution of the executable instructions. For example, after activating (e.g., "waking up") a voice-controlled device with a spoken wake-word, a user may speak a spoken command to the voice-controlled device to play a particular song. The spoken command may be sent to one or more remote computing devices which may, in turn, translate the spoken command into executable instructions. The executable instructions may be executed by one or more computing devices to stream an audio file of the song from a particular online music service to the voice-controlled device. Thereafter the voice-controlled device may output the audio to a speaker for playback.

DETAILED DESCRIPTION

Figure 1:
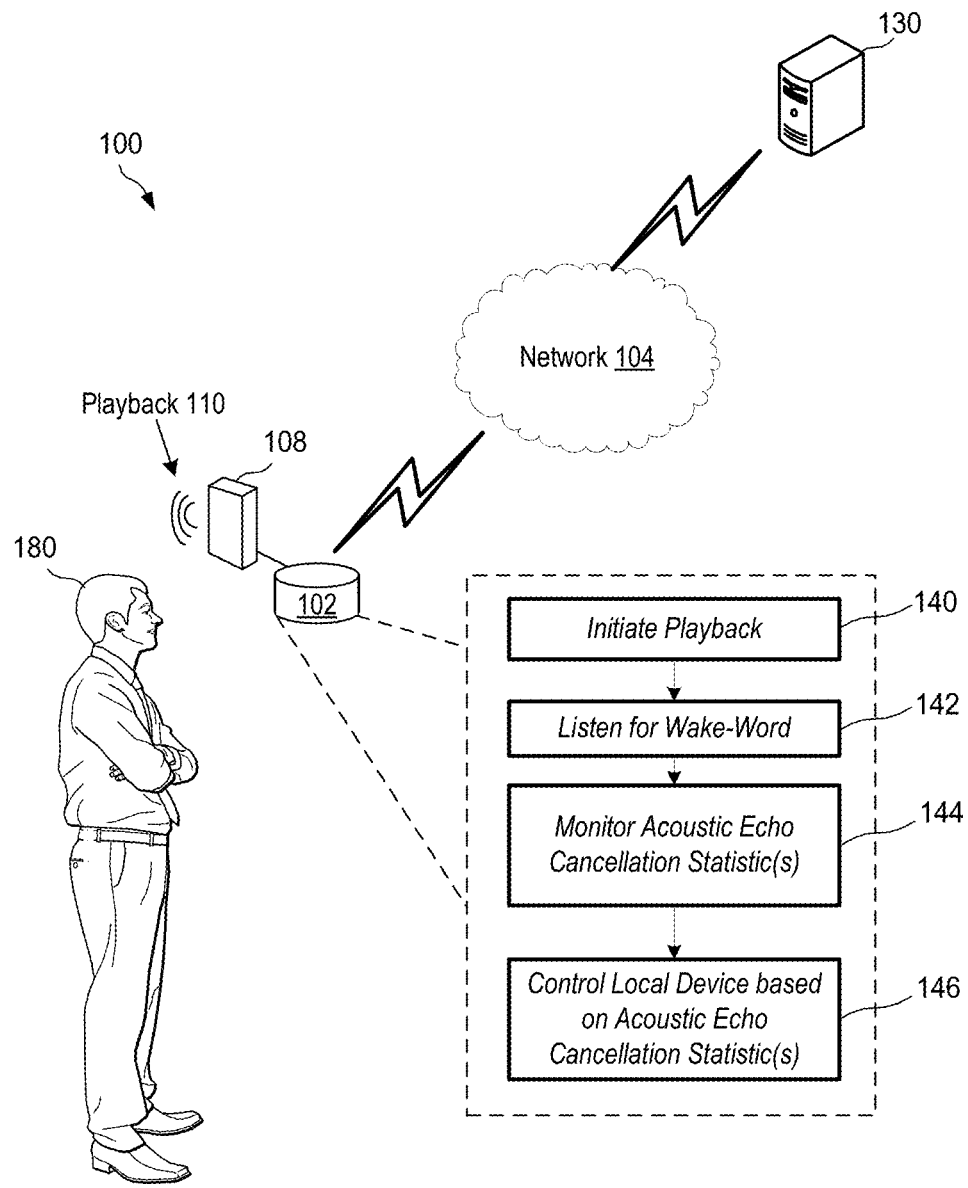
FIG. 1 illustrates a system effective to control an automatic speech recognition device using acoustic echo cancellation statistics, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for prevention of wake-word false trigger prevention during audio playback and other methods of controlling an automatic speech recognition (ASR) enabled device based on acoustic echo cancellation statistics. During audio playback a part of the audio may acoustically resemble a wake-word of a voice-controlled device. Accordingly, detection of the part of the audio resembling the wake-word may trigger a wake-word engine and may enable further speech-recognition processing. Triggering of the wake-word engine may cause playback of the audio to be paused while the voice-controlled device "listens" for a speech command. In various examples, an voice-controlled device may listen for a speech command by receiving and recording audio captured through a microphone of the voice-controlled device. The recorded audio may be sent to a speech recognition server or other computing device for translation into an executable command or for other processing. Pausing audio playback due to a wake-word present or detected from the audio stream can be confusing to a user. Additionally, pausing audio playback due to a wake-word present or detected from the audio stream can result in a portion of the audio playback not being heard by the user due to attenuation of the audio playback signal while the voice-controlled device is pausing playback. Additionally, in some examples, a portion of the audio playback following a detected wake-word may be interpreted as a speech command. The techniques described herein allow for a computationally efficient means of distinguishing between a wake-word spoken by a user and a wake-word (or audio acoustically similar to a wake-word) present in audio playback. Wake-words determined to be present in the audio playback (and not spoken by a user) may be ignored without pausing or attenuating the playback audio.

In some examples, it may be possible to employ a secondary wake-word engine to monitor downlink audio (e.g., playback audio from the voice-controlled device) to detect the presence of a wake-word separately. However, such a solution may not be appropriate for resource-constrained platforms, such as, for example, voice-controlled devices with little on-device processing power and/or memory and/or voice-controlled devices with power consumption concerns. Accordingly, the solutions described herein leverage an existing performance metric generated by various voice-controlled devices to determine whether or not a detected wake-word was generated by downlink audio or by a user utterance (e.g., a user-spoken wake-word).

FIG. 1 illustrates a system 100 effective to control a voice-controlled device using acoustic echo cancellation (AEC) statistics to prevent wake-word false triggering during audio playback or to otherwise control the voice-controlled device, in accordance with various aspects of the present disclosure. The system includes a local device 102 and a remote device 130 in communication with one another via a network 104. The local device 102 may be configured to receive and response to wake-words and execute audible commands. In an example, the local device 102 may be listening for a wake-word or an audible command to operate the local device 102. In the example depicted in FIG. 1, user 180 may have previously used a wake-word to activate local device 102 and issued an audio command to initiate playback, as illustrated in block 140. Initiation of playback may comprise streaming music, text to speech (TTS), a voice-over-IP call and/or other audio to local device 102. Local device 102 may send audio to loudspeaker 108 for playback 110 of the audio. In various examples, loudspeaker 108 may be integrated within local device 102 or may be a stand alone speaker effective to receive an audio signal from local device 102 or from a remote computing device via network 104. In various examples, the AEC statistics described herein may be used to determine whether or not an external loudspeaker 108, separate from local device 102, is powered off, or is otherwise unavailable for streaming audio. After making such a determination, local device 102 may instead output an audio stream via an internal loudspeaker of local device 102.

At block 142, during downlink audio playback, local device 102 may be listening for a wake-word. If the wake-word is determined by the various techniques described herein to be provided by a user utterance, audio playback may be paused and/or attenuated in order to better receive and interpret a spoken command from the user. However, if the wake-word is determined by the various techniques described herein to be provided by the downlink audio playback, local device 102 may ignore the wake-word without attenuating, pausing, or otherwise interrupting the audio playback.

Local device 102 may comprise an acoustic echo cancellation (AEC) component. The AEC is used to attenuate the echo of the playback 110 detected by a microphone of local device 102 in the uplink channel. Depending on the volume of playback 110, the nature of the audio of playback 110 (e.g., voice, music, etc.), and/or on the acoustics of a particular space in which loudspeaker 108 and local device 102 are located, the echo from playback 110 picked up by the microphone of local device 102 may be significant. Accordingly, the AEC removes echo in the uplink channel due to playback 110 by modeling the loudspeaker-enclosure-microphone transfer function path while maintaining the near-end speech undistorted. A metric for measuring the attenuation of the energy of the echo by the AEC is referred to as Echo Return Loss Enhancement (ERLE). In general, when the AEC filter has converged (e.g., within a few seconds from boot up of an voice-controlled device), the ERLE of the voice-controlled device with a good loudspeaker may be about 25 dB on average. ERLE performance (and AEC performance) may vary based on several factors such as a distance between the loudspeaker 108 and a microphone of local device 102, distortion of loudspeaker 108, echo path changes (EPC), convergence/tracking speed of AEC, and/or the amount of residual echo (RE).

Other statistics of the AEC component may be monitored and used to control a voice-controlled device such as local device 102 in various ways. Examples of statistics of the AEC component (sometimes referred to herein as "AEC statistics") may include the ERLE, correlations (e.g., correlation values) between an input signal (e.g., a signal received by a microphone) and an output signal (e.g., a signal output to one or more loudspeakers), an energy level of a signal output to a loudspeaker, a determination of the existence of a "double talk" condition, during which a user utterance of the wake-word is detected by one or more microphones of local device 102 in the presence of playback 110, etc. In some examples, AEC statistics may be used to determine the source of a particular signal. The determination of the source may, in turn, be used to control the behavior of a voice-controlled device, as described herein.

At block 144, local device 102 may monitor one or more of the AEC statistics. For example, local device 102 may monitor the ERLE of the AEC component. Blocks 140, 142, and 144 may occur simultaneously. In other words, local device 102 may have initiated playback 110, may be listening for a wake-word, and may be monitoring ERLE and/or one or more other AEC statistics. As will be described in further detail below, the AEC statistics may be used by local device 102 to update a wake-word accept/reject flag. The wake-word accept/reject flag may be indicator data used to indicate to a wake-word engine whether a detected wake-word should be accepted or rejected. In one implementation, the wake-word accept/reject flag may be represented by a single Boolean bit—"0" or "1". In some other examples, multiple bits may be used to represent the wake-word accept/reject flag. The wake-word accept/reject flag may determine whether or not a detected wake-word is accepted and passed to remote device 130 over network 104 or, conversely, is rejected and ignored. As described in further detail below, at block 146, an AEC Statistics Engine 412 (depicted in FIG. 4) may be used to monitor ERLE levels and/or other AEC statistics and to control local device 102. For example, AEC Statistics Engine 412 may determine whether a wake-word was present in playback 110 (in which case the wake-word accept/reject flag would be set to "reject") or was spoken by a user, such as user 180 (in which case the wake-word accept/reject flag would be set to "accept"). In the example depicted in FIG. 1, the wake-word accept/reject flag may have been set to "reject" at a time associated with the detection of a wake-word by local device 102. As such, the AEC Statistics Engine 412 may have determined that the detected wake-word was present in audio playback 110 as opposed to being present in a user utterance. The wake-word accept/reject flag may be provided to a wake-word engine of local device 102. Accordingly, in the example, the wake-word engine may ignore the wake-word based on the wake-word accept/reject flag being set to "reject".

In another example, local device 102 may be sending audio to an external loudspeaker 108 for playback 110. AEC Statistics Engine 412 may determine that a low correlation exists (e.g., a correlation value below a low threshold correlation value) between a microphone input signal and the audio output signal sent to external loudspeaker 108. Accordingly, AEC Statistics Engine 412 may determine that the external loudspeaker 108 is either powered off or is otherwise currently unable to output the audio. In the example, AEC Statistics Engine 412 may control local device 102 to send the audio signal to an internal speaker of local device 102.

Figure 2:
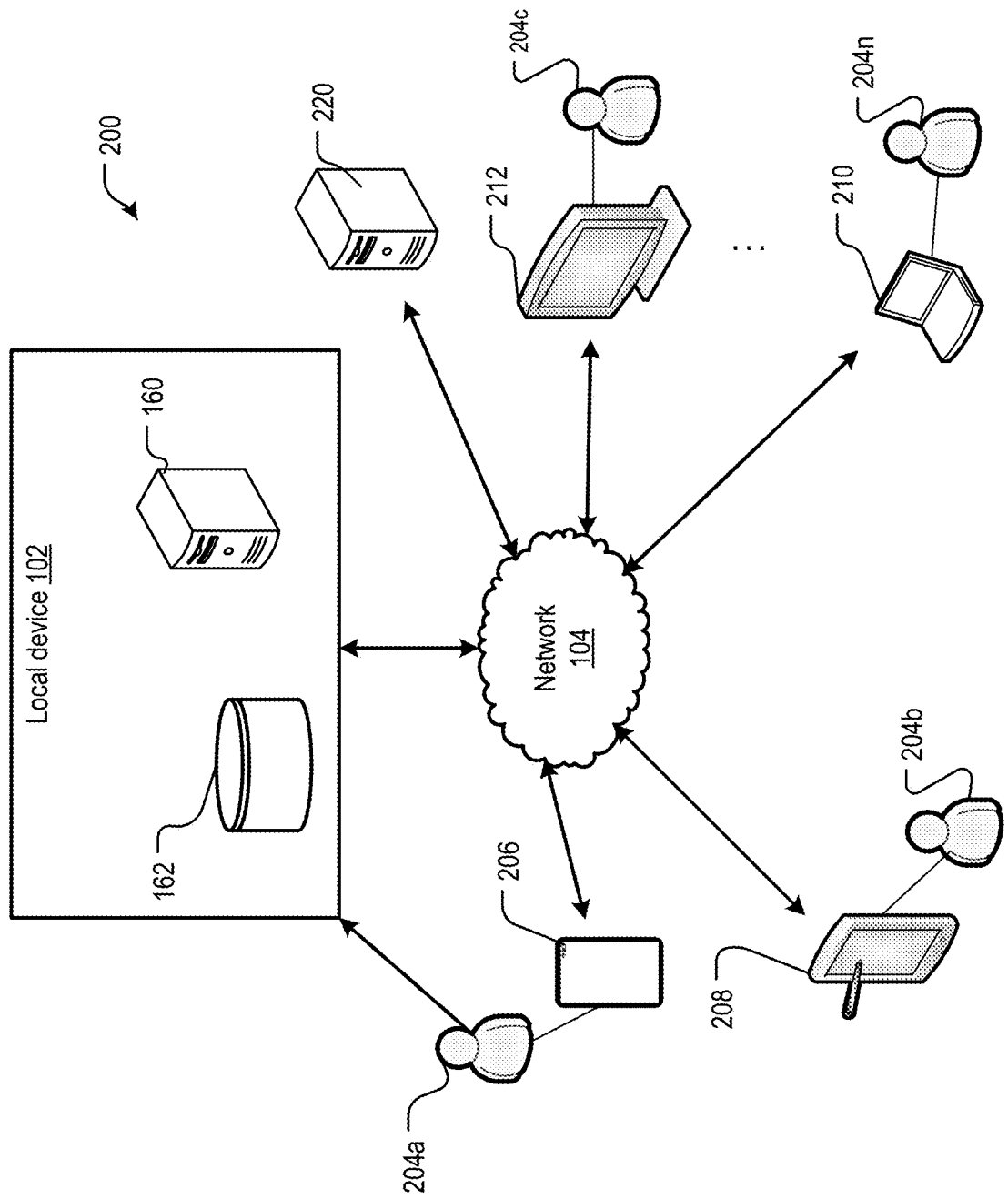
FIG. 2 depicts an example environment in which the system for control of an automatic speech recognition device using acoustic echo cancellation statistics may be disposed, in accordance with various aspects of the present disclosure.

FIG. 2 depicts an example of an environment 200 in which the system for wake-word false trigger prevention may be disposed, in accordance with various aspects of the present disclosure. In the example shown in FIG. 2, local device 102 comprises a processor 160 and a memory 162 although, as described in further detail herein, local device 102 may further comprise other components, such as a microphone and/or a microphone array, an audio output interface, a loudspeaker, etc.

The environment 200 comprises local device 102 and users 204*a*, 204*b*, 204*c*, 204*n*. Each user 204*a*, 204*b*, 204*c*, and 204*n* may use one or more user devices such as, for example, mobile device 206, tablet computer 208, laptop computer 210, and/or display device 212. Although four users 204*a*, 204*b*, 204*c*, 204*n* are shown, any suitable number of users may be part of the environment 200. Also, although each user 204*a*, 204*b*, 204*c*, 204*n* shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

In some examples, the memory 162 of local device 102 may store instructions effective to monitor AEC Statistics to update a wake-word accept/reject flag and to distinguish between a wake-word detected as a part of audio playback versus a wake-word that is part of a user utterance. In various other examples, the memory 162 of local device 102 may store instructions to cause AEC Statistics Engine 412 to monitor one or more other AEC statistics to control local device 102 using the various techniques described herein.

The various components of the environment 200 may be in communication with one another via a network 104. The network 104 may be and/or comprise any suitable wired or wireless network configured according to any suitable architecture or protocol. In some examples, the network 104 may comprise the Internet, a local area network (LAN), a wide area network (WAN), or the like.

In some examples, various user devices, such as mobile device 206, tablet computer 208, display device 212, and laptop computer 210 may be configured in communication with local device 102. In various examples, user devices may execute a companion application to control various settings of local device 102 and/or to execute various functions by local device 102.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. Although user devices are described as mobile device 206, tablet computer 208, display device 212, and/or laptop computer 210, the user devices may be any suitable type of computing device comprising at least one processor and non-transitory computer-readable memory. In some examples, the user devices, such as mobile device 206, tablet computer 208, display device 212, and/or laptop computer 210, may be configured to communicate on a cellular or other telephone network.

In various examples, users, such as users 204a, 204b, 204c, 204n may control local device 102 using audible commands. For example, a user 204a may speak a "wake-word" that may be a spoken, audible command. A wake-word may be, for example, a word or phrase for which a wake-word engine of local device 102 continually listens. A microphone and/or microphone array of local device 102 may detect the spoken wake-word and, in response, subsequent audio captured by the microphone and/or microphone array will be processed to detect further audible commands and/or the subsequent audio received by the microphone of local device 102 may be transmitted to one or more voice recognition servers 220. In the example, user 204a may "wake" the local device 102 to further voice commands using the wake-word, and may thereafter speak an audible command for local device 102 to play a particular song.

Similarly, a user may speak an audible command for local device 102 to read a news article. Audio may be transmitted/streamed from local device 102 over network 104 to the one or more voice recognition servers 220 in any audio file format, such as mp3, mp4, or the like. The one or more voice recognition servers 220 may receive the transmitted or streamed audio. Upon determining that the audio content has reached an endpoint, the one or more voice recognition servers 220 may analyze the received audio stream and may translate the audio stream into natural language. The one or more voice recognition servers 220 may determine whether or not the natural language corresponds to a command. If so, the one or more voice recognition servers 220 may send the command over network 104 to one or more other computing devices to execute the command. For example, a user 204a may speak the command, "Play rock music" to local device 102 after waking local device 102 with a wake-word. Local device 102 may transmit the voice command to the one or more voice recognition servers 220. The one or more voice recognition servers 220 may analyze the audio stream and may translate the audio stream into natural language. The one or more voice recognition servers 220 may determine that the natural language "Play rock music" corresponds to a command effective to request rock music be played by an online music streaming service to which a user of local device 102 has access. The one or more voice recognition servers 220 may send the command over network 104 to a computing device of the online music streaming service. The command may be effective to cause the online music streaming service to stream rock music (e.g., a rock music playlist or compilation) over network 104 to local device 102. Local device 102 may receive the stream and may output the rock music through a loudspeaker (e.g., loudspeaker 108 depicted in FIG. 1).

Figure 3:
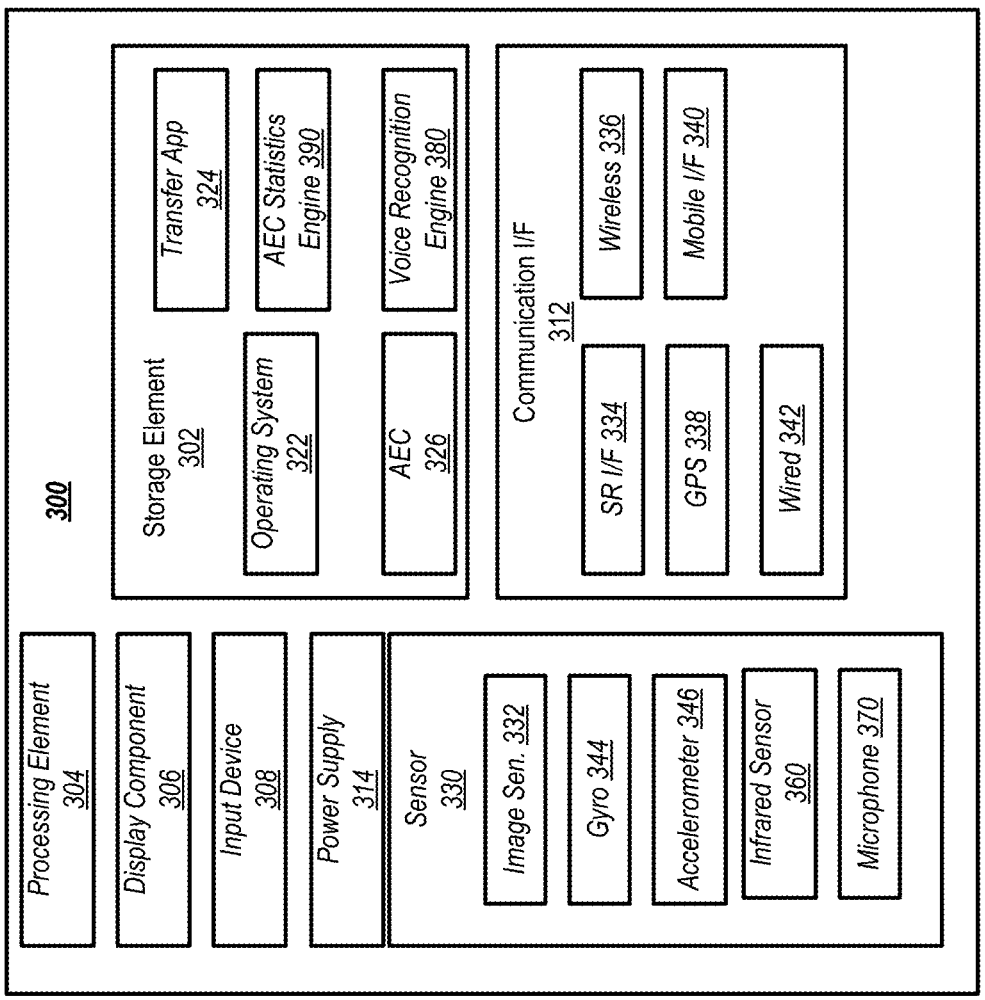
FIG. 3 is a block diagram showing an example architecture of a computing device in which the system to control an automatic speech recognition device using acoustic echo cancellation statistics described in the present disclosure, or a portion thereof, may be implemented, in accordance with various embodiments described herein.

FIG. 3 is a block diagram showing an example architecture 300 of a user device, such as local device 102, in accordance with various aspects of the present disclosure. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to monitor AEC statistics (e.g., ERLE, the existence of a double talk condition, etc.) and to perform acoustic echo cancellation. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images, audio, and/or video from another device (e.g., a mobile device, image capture device, and/or display device) or from an image sensor 332 and/or microphone 370 included in the architecture 300. In some examples, the transfer application 324 may also be configured to send the received voice commands to a voice recognition server 220.

In some examples, storage element 302 may include an AEC component 326. The AEC may be effective to attenuate echo from a downlink playback of audio by local device 102 (e.g., AEC may attenuate echo of playback 110 depicted in FIG. 1). In some further examples, storage element 302 may include an AEC Statistics Engine 390. The AEC Statistics Engine 390 may determine the AEC statistics of the AEC component 326 and may determine, based on the characteristics of the AEC statistics, whether to perform one or more actions, such as whether to set a wake-word accept/reject flag to "accept" (wherein a detected wake-word may be effective to "wake up" local device 102—causing local device 102 to pause/attenuate playback and to listen for further audio commands) or "reject" (wherein a detected wake-word may be ignored and playback may not be interrupted).

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors, or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 or an array of microphones for capturing sounds, such as voice commands. Voice recognition engine 380 may interpret audio signals of sound captured by microphone 370. In some examples, voice recognition engine 380 may listen for a "wake-word" to be received by microphone 370. Upon receipt of the wake-word, voice recognition engine 380 may stream audio to a voice recognition server for analysis, as described above in reference to FIGS. 1 and 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents local device 102 (shown in FIG. 1), mobile interface 340 may allow local device 102 to communicate with one or more other computing devices such as the various computing devices shown in FIG. 2. For example, local device 102 may receive a command from a user device, an application of a user device, or a voice recognition server to perform an action.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be a camera configured to capture color information, image geometry information, and/or ambient light information.

Motion sensors may include any sensors that sense motion of the architecture including, for example, gyro sensors 344 and accelerometers 346. Motion sensors, in some examples, may be used to determine an orientation, such as a pitch angle and/or a roll angle, of local device 102. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Infrared sensor 360 may be effective to determine a distance between a surface and the device including the infrared sensor 360. In some examples, the infrared sensor 360 may determine the contours of the surface and may be capable of using computer vision techniques to recognize facial patterns or other markers within the field of view of the infrared sensor 360's camera. In some examples, the infrared sensor 360 may include an infrared projector and camera. Processing element 304 may build a depth map based on detection by the infrared camera of a pattern of structured light displayed on a surface by the infrared projector. In some other examples, the infrared sensor 360 may include a time of flight camera that may compute distance based on the speed of light by measuring the time of flight of a light signal between a camera of the infrared sensor 360 and a surface. Further, in some examples, processing element 304 may be effective to determine the location of various objects in the physical environment within the field of view of local device 102 based on the depth map created by the infrared sensor 360. As noted above, in some examples, non-infrared depth sensors, such as passive stereo camera pairs, or non-identical camera pairs, may be used in local device 102 in place of, or in addition to, infrared sensor 360. Processing element 304 may be effective to determine the location of various objects in the physical environment within the field of view of a camera of architecture 300 based on the depth map created by one or more non-infrared depth sensors.

Figure 4:
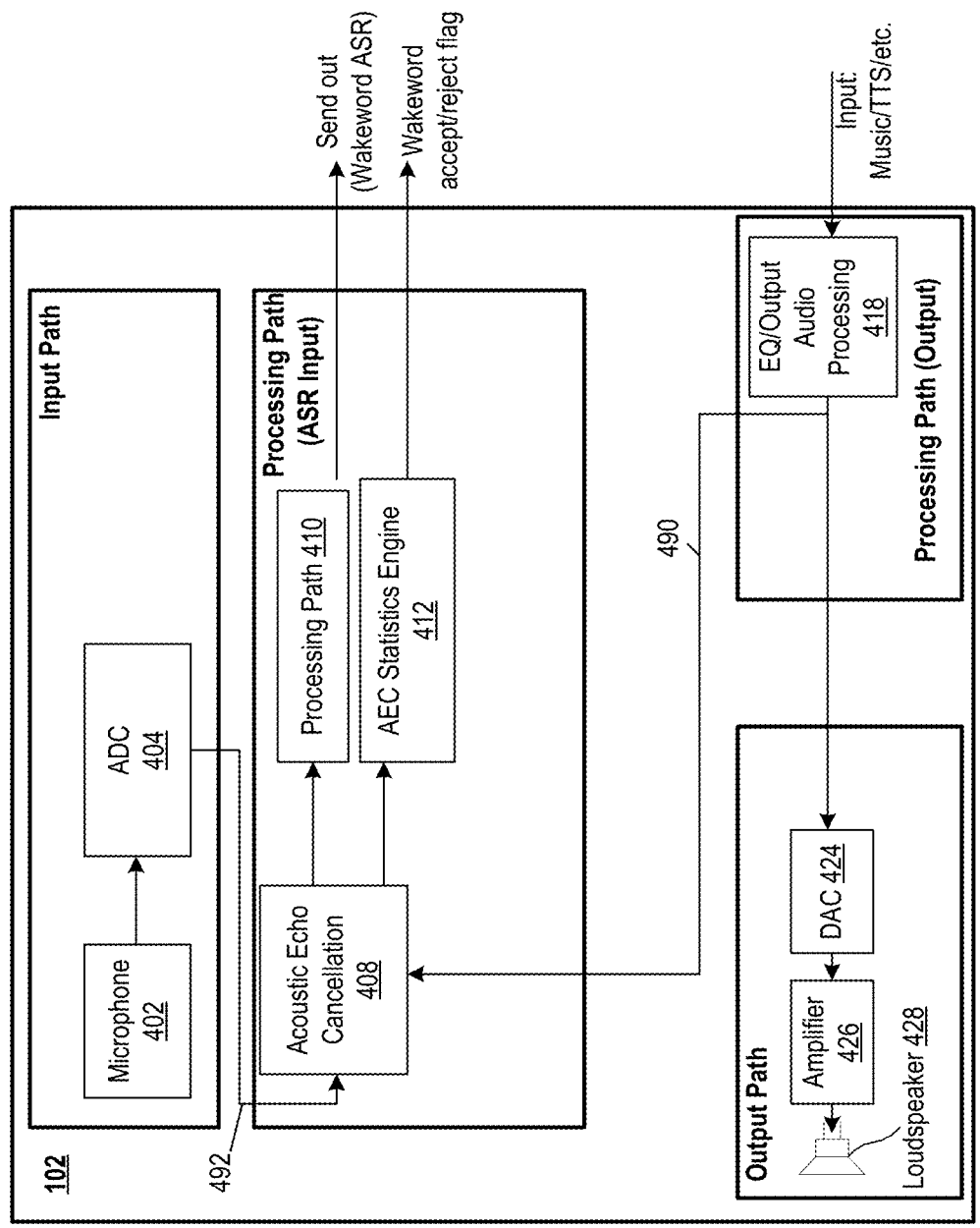
FIG. 4 illustrates example signal processing paths for a system effective to control an automatic speech recognition device using acoustic echo cancellation statistics, in accordance with various aspects of the present disclosure.

FIG. 4 illustrates example signal processing paths for a system effective to control a voice-controlled device using AEC statistics, in accordance with various aspects of the present disclosure. Those components of FIGS. 1-3 that have been described above may not be described again herein for purposes of brevity and clarity.

As depicted in FIG. 4, an input signal processing path may comprise a microphone 402 effective to detect acoustic vibration (e.g., sound waves) and convert the vibration into electrical signals for further processing. An analog to digital converter (ADC) 404 may be used to convert analog signals detected by microphone 402 into the digital domain. The resultant digital input audio signal 492 may be sent to AEC 408 and AEC Statistics Engine 412. Additionally, although not depicted in FIG. 4, in some examples, the audio signal 492 may be sent to AEC Statistics Engine 412.

An output signal processing path may comprise receiving a source audio stream ("Input: Music/TTS/etc.") from an external source. At block 418 the received audio stream may be equalized, limited, volume controlled, etc. After processing the audio signal at block 418, the processed and/or equalized audio signal may be sent as reference signal 490 to AEC 408. AEC 408 may be used with any number of audio channels (e.g., mono, stereo, 5.1, etc.) Additionally, the source audio stream may be provided to an audio driver for output on the output path. The source audio stream signal may be sent to a digital to analog converter (DAC) 424. The analog audio stream is then amplified by one or more amplifier stages 426 and output by a loudspeaker 428. As previously described, loudspeaker 428 may be integrated into local device 102 or may be separate from and configured in communication with local device 102.

The output signal processing path may further comprise processing path 410. In various examples, processing path 410 may include various beam-forming components (fixed and/or adaptive), an adaptive reference AEC, a beam steering component, etc. Further, in various examples, processing path 410 may include a frequency domain residual echo suppression component, a noise reduction component, a time domain residual echo suppression component, an automatic gain control component, etc.

AEC Statistics Engine 412 may monitor ERLE values generated by AEC 408 as well as the other AEC Statistics described herein. In the absence of any playback and sound detected by microphone 402, the ERLE may be close to 0 dB. When there is no playback or sound detected by microphone 402, AEC 408 is essentially inactive since there is no downlink signal to cancel. Detecting an ERLE value of 0 dB (or within a predefined tolerance level of 0 dB) may be used as an indication that acoustic echo cancellation has no effect (or very little affect in the case of small, non-zero values) on microphone signals.

In some examples, if a near-end user (e.g., user 180 depicted in FIG. 1) is silent during playback 110, the ERLE may increase and may converge at or near a steady-state value. Similarly, there may be a strong correlation between input microphone signals and output playback signals (e.g., between signal 492 and signal 490). In various examples, a steady state ERLE condition may be from about 15 dB to about 25 dB, depending on the particular device (e.g., depending on the loudspeakers used, the microphone(s) used, and the position of the microphone(s) and/or loudspeakers relative to one another). A condition of silence from the near end user during playback 110 and a steady state ERLE value may indicate a "Single-Talk" condition (ST) since the AEC is canceling the acoustic echoes from playback 110 (as represented in input audio signal 492) by using the reference signal 490 (e.g., the downlink signal). Similarly, a strong correlation between signal 492 and signal 490 may indicate the presence of an ST condition. During the ST condition described above, a detected wake-word may indicate that the wake-word is present in the residual echo of the input audio signal 492 following acoustic echo cancellation by AEC 408. Further, the ST condition described above may indicate that the detected wake-word is unlikely to have been spoken by a near-end user. Accordingly, AEC Statistics Engine 412 may set the wake-word accept/reject flag to "reject" when a wake-word is detected during the ST condition described above.

If a near-end user (e.g., user 180 depicted in FIG. 1) utters a spoken command to local device 102 during the presence (or absence) of audio playback from loudspeaker 428 (e.g., music or voice playback from the loudspeaker) the ERLE will drop abruptly as it is a "Double-Talk" (DT) condition for AEC 408. Similarly, the correlation between reference signal 490 and input audio signal 492 may decline sharply during a DT condition. In this context, DT refers to a situation which would cause AEC 408 to readapt due to the user 180 speaking a command since the AEC 408 does not have a reference signal 490 corresponding to the user-spoken command in input audio signal 492 to cancel. In various examples, the reference signal 490 and/or the input audio signal 492 may be time-stamped in order for AEC 408 to compare corresponding portions of the audio streams represented by reference signal 490 and input audio signal 492. Accordingly, such an abrupt drop in ERLE and/or in the correlation between input audio signal 492 and reference signal 490 may indicate that a detected wake-word is the result of a user speaking the wake-word (sometimes referred to herein as a "near end barge in") as opposed to a wake-word present in the playback 110. Accordingly, AEC Statistics Engine 412 may set the wake-word accept/reject flag to "accept" during the DT condition described above. In the previous example, AEC statistics detected by AEC Statistics Engine 412 are used to control a voice-controlled device (e.g., local device 102) to distinguish between a wake-word present in playback and a wake-word spoken by a user. However, the AEC Statistics Engine 412 may monitor various AEC statistics for various other purposes (e.g., to detect current playback conditions, external loudspeaker connectivity, etc.).

In various examples, the magnitude of the decrease in the ERLE value as well as the rate of decrease/decline may be used to determine whether a near end barge in has occurred.

Similarly, a change in the strength of a correlation between input audio signal 492 and reference signal 490 may be used to determine whether a near-end barge in has occurred. For example, if playback of audio is occurring for several minutes an average ERLE detected by AEC Statistics Engine 412 may be 20 dB. Thereafter, if user 180 speaks a wake-word, a DT condition may occur. The ERLE may drop quickly from 20 dB to 10 dB within 1-10 audio frames (e.g., from about 5 ms-50 ms). Accordingly, the AEC Statistics Engine 412 may set the wake-word accept/reject flag to "accept". However, if the average ERLE was determined to have dropped from 20 dB to 18 dB over the same period of time, such a drop may not trigger the DT condition and the wake-word accept/reject flag may be set to "reject". An example implementation of an algorithm that may set the wake-word accept/reject flag based on ERLE is provided herein, although different algorithms and different AEC statistics may be used in accordance with various aspects of the present disclosure. Generally, the amount by which the ERLE drops and the rate at which the ERLE drops may be used to set the wake-word accept/reject flag to "accept". Conversely, the rate at which ERLE rises and a high ERLE threshold (e.g., above a typical steady state ERLE value for music playback) may be used to set the wake-word accept/reject flag to "reject".

An example implementation of a process for setting the wake-word accept/reject flag based on ERLE is provided below, in accordance with an example embodiment of the present disclosure. The example processing techniques described below describe one possible implementation, but other implementations are possible in accordance with the general techniques described above. Additionally, other AEC statistics apart from and together with ERLE may be used to determine whether or not to take one or more actions to control local device 102, in accordance with various aspects of the present disclosure.

In various examples, a machine learning classification system may be used to make determinations as to the source of a signal based on AEC statistics. The machine learning classification may use a decision tree algorithm. The decision tree algorithm may receive the reference signal 490, the input audio signal 492, and one or more AEC statistics from AEC Statistics Engine 412, and may control local device 102 based on the various inputs. For example, if, during playback of music, the correlation between input audio signal 492 and reference signal 490 is very low, the decision tree algorithm may determine that communication with an external speaker is unavailable. Accordingly, the decision tree algorithm may cause local device 102 to output the music for playback through an internal speaker of local device 102. In various further examples, a neural network may be used to monitor AEC statistics and to take one or more actions in response to the various changes in AEC statistics described herein.

In order to address the issue of wake-word triggering during playback (e.g., where the wake-word is part of reference signal 490), a Boolean flag (e.g., the wake-word accept/reject flag) may be used. If the wake-word engine detects a wake-word and the flag is set to "true" (e.g., "reject") the wake-word may be ignored, otherwise, if the flag is set to "false" (e.g., "accept") the wake-word may be accepted. The wake-word accept/reject flag relies on computing the Echo Return Loss Enhancement (ERLE) and applying post-processing to the computed ERLE to generate a Boolean flag. Post-processing may be carried out by applying a series of linear and non-linear operators.

The example ERLE algorithm functionality is captured by the following set of equations:

$$P_{mic,avg}[n] = (1-\alpha_p) \cdot |d[n]|^2 + \alpha_p \cdot P_{mic,avg}[n-1] \quad (1)$$

Eq.(1): Smoothed microphone power computation. Typical smoothing values for calculating microphone "d[n]" average power may be 0.98 and may be provided by a leaky-integrator.

$$P_{AECout,avg}[n] = (1-\alpha_p) \cdot |e[n]|^2 + \alpha_p \cdot P_{AECout,avg}[n-1] \quad (2)$$

Eq.(2): Smoothed AEC output power computation. Typical smoothing values for calculating AEC output "e[n]" average power may be 0.98 and may be provided by a leaky-integrator.

$$x_1[n] \triangleq 10 \cdot \log_{10}\left(\frac{P_{mic,avg}[n]}{P_{AECout,avg}[n]}\right) \quad (3)$$

Eq.(3): Definition of Echo-Return-Loss-Enhancement (ERLE).

$$x_2[n] = (1-\alpha_{FAST}) \cdot x_1[n] + \alpha_{FAST} \cdot x_2[n-1] \quad (4)$$

$$x_3[n] = (1-\alpha_{SLOW}) \cdot x_1[n] + \alpha_{SLOW} \cdot x_3[n-1] \quad (5)$$

Eqs.(4,5): Fast and Slow smoothing of the ERLE metric. Typical time-constants for fast and slow smoothing may be 0.900 and 0.995, respectively.

$$x_4[n] = (1-\alpha_{SLOW}) \cdot |x_1[n]|^2 + \alpha_{SLOW} \cdot x_4[n-1] \quad (6)$$

$$x_5[n] = x_4[n] - |x_3[n]|^2 \quad (7)$$

Eqs.(6,7): Second statistical moment and variance computation of the ERLE metric respectively.

$$x_6[n] = x_2[n] - x_3[n] \quad (8)$$

Eq.(8): Subtraction in order to remove bias and emphasize on trend of the ERLE metric (upwards or downwards).

$$x_7[n] = \begin{cases} 1, & (x_6[n] > THR1) \text{ OR} \\ & (x_5[n] < VARTHR \text{ AND } x_3[n] > THR2) \\ 0, & \text{else} \end{cases} \quad (9)$$

Eq.(9): If a positive trend that exceeds a threshold "THR1" is detected OR if the ERLE exhibits a high value (determined by "THR2") and is converged (small variance threshold determined by "VARTHR") then output "1". Otherwise output "0". Typical value for "THR1" may be zero or about 10^(-10) to avoid potential numerical issues. Typical values for "THR2" and "VARTHR" may be 15 dB and 0.6 respectively.

$$x_8[n] = \begin{cases} x_7[n], & x_7[n] > 0 \\ a_{hold} \cdot x_8[n-1], & \text{else} \end{cases} \quad (10)$$

$$x_9[n] = \begin{cases} 1, & x_8[n] > HOLD\_THRESH \\ 0, & \text{else} \end{cases} \quad (11)$$

$$\text{where: } a_{hold} = 10^{\frac{\log_{10}(HOLD_{THRESH})}{\tau \cdot F_S}} \quad (12)$$

$$F_S = \frac{16000}{128} = 125 \text{ samples/sec} \quad (13)$$

Eq.(13): Example definition of sampling rate.

Eqs.(10,11,12): Apply additional hold-time on the wake-word accept/reject flag generated by Eq.(9) (if needed) in order to align the wake-word detection timing. If the output of Eq.(9) is positive, then pass the signal as is (instantaneous attack time). Otherwise, if the output of Eq.(9) is negative, apply exponential decay. The exponentially decayed function is now subjected to a new threshold in order to increase the hold-time (amount of time that the wake-word accept/reject flag remains "true" after a negative-edge was detected) by $\tau$. For example, if a pulse produced by Eq.(9) exhibits a negative edge at t0=1 sec the positive duration may be extended by another 0.2 seconds. Accordingly, Eq.(12) may be computed as follows: (assume $HOLD_{THRESH}$=0.1). Eq.(12): $\alpha_{hold}$=10^(log 10(0.1)/(125*0.2))=>$\alpha_{hold}$=0.9120

$$x_{10}[n] = \begin{cases} x_9[n], & x_1[n] \geq \text{ERLE\_THRESH} \\ 0, & \text{else} \end{cases} \quad (14)$$

$\tau$=specified hold time in seconds for a given HOLD THRESH exponential threshold Eq.(14): If the ERLE (defined by Eq.(3)) drops below a threshold "ERLE THRESH" the decision made in Eq.(11) may be bypassed. The flag wake-word accept/reject flag may be equal to zero otherwise pass the flag as is. This condition is introduced to ensure that a false rejection rate does not degrade when a near-end user tries to activate the device. When a near-end user issues a command, the ERLE is expected to drop abruptly since this corresponds to a DT condition.

Figure 5:
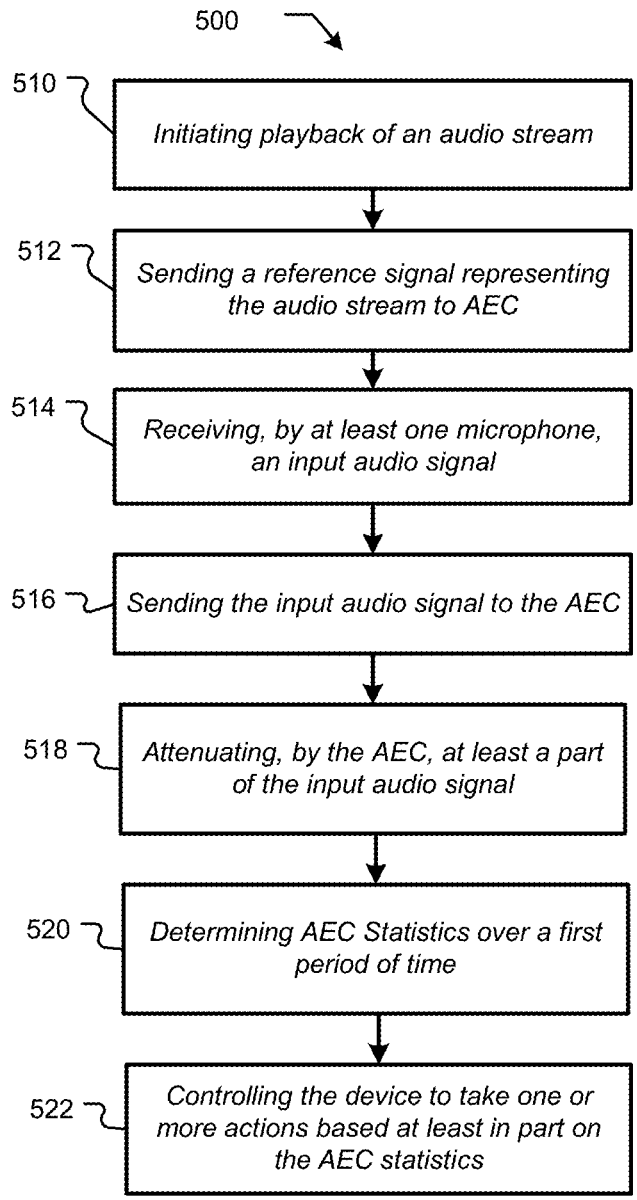
FIG. 5 depicts a flow chart showing an example process for controlling an automatic speech recognition device using acoustic echo cancellation statistics, in accordance with various aspects of the present disclosure.

In the example implementation algorithm above, the proposed use of the "ERLE_FLAG" (e.g., the wake-word accept/reject flag) of Eq.(14) is:

IF WAKE-WORD==DETECTED AND ERLE_FLAG==TRUE (for more than 50% of the time interval [wwEndTime−0.5*(wwEndTime−wwStartTime), wwEndTime]) THEN IGNORE WAKE-WORD ELSE IF WAKE-WORD==DETECTED AND ERIE_FLAG==FALSE (for more than 50% of the time interval [wwEndTime−0.5*(wwEndTime−wwStartTime), wwEndTime]) THEN ACCEPT WAKE-WORD FIG. 5 is a flow chart showing an example process for controlling a voice-controlled device using AEC statistics, in accordance with various aspects of the present disclosure. The process flow 500 of FIG. 5 may be executed by local device 102 and/or by a combination of local device 102 and a computing device configured to be in communication with local device 102, in accordance with various aspects of the present disclosure. The actions of process flow 500 may represent a series of instructions comprising computer-readable machine code executable by a processing unit of a computing device or of local device 102. In various examples, the computer-readable machine code may be comprised of instructions selected from a native instruction set of the computing device and/or an operating system of the computing device. Various actions in process flow 500 may be described with reference to elements of FIGS. 1-4.

At action 510 of process flow 500, local device 102 may initiate playback of an audio stream. In various examples, local device 102 may detect a wake-word spoken by a user in the absence of audio playback. The user may thereafter issue a spoken command to local device 102. For example, after saying the wake-word and awakening local device 102, the user may say "Read chapter 2 of Of Mice and Men." Local device 102 may record the spoken command and may send the recorded audio over network 104 to one or more voice recognition servers 220. The voice recognition servers may analyze the received audio stream and may translate the audio stream into natural language. The one or more voice recognition servers 220 may determine whether or not the natural language corresponds to a command. If so, the one or more voice recognition servers 220 may send the command over network 104 to one or more other computing devices to execute the command. For example, a text to speech service may begin streaming an audio signal to local device 102 that, when played back, audibly "reads" the text of Chapter 2 of Of Mice and Men by John Steinbeck. The audio signal may be played back via a loudspeaker of local device 102 or may be played back by a loudspeaker that is configured in communication with local device 102.

Processing may continue from action 510 to action 512, "Sending a reference signal representing the audio stream to AEC." At action 512, the audio signal may be sent as a reference signal to an acoustic echo cancellation unit. For example, as shown in FIG. 4, the input audio signal may be equalized and sent as reference signal 490 to AEC 408. The reference signal may be compared to an input signal detected by one or more microphones of local device 102 to identify echo which may then be attenuated by AEC 408.

Processing may continue from action 512 to action 514, "Receiving, by at least one microphone an input audio signal." At action 514, at least one microphone of local device 102 may receive an input audio signal. The input audio signal may comprise any audible sound detected by one or more microphones of local device 102. In various examples, the audible sounds represented by the input audio signal may comprise speech spoken by a user of local device 102, background noise (e.g., traffic, a television, music playing elsewhere, ambient sounds), and/or echo from the playback of the audio stream for which playback was initiated at action 510.

Processing may continue from action 514 to action 516, "Sending the input audio signal to the AEC." At action 516, the input audio signal may be sent to AEC 408. AEC 408 may compare the input audio signal to the reference audio signal and may attenuate those parts of the input audio signal that match parts of the reference signal. Accordingly, echo, background noise and/or other sounds may not be translated into an actionable command on the audio signal input path of local device 102.

Processing may continue from action 516 to action 518, "Attenuating, by the AEC, at least a part of the input audio signal." At action 518, AEC 408 may attenuate parts of the input audio signal that match the reference signal. Accordingly, the attenuated parts of the input audio signal may not be translated into natural language and/or commands by local device 102 and/or by one or more voice recognition servers 220.

Processing may continue from action 518 to action 520, "Determining AEC statistics over a first period of time." At action 520, local device 102 may determine AEC statistics, such as the ERLE values of the attenuation over a first period of time. ERLE values may be a quantitative measure of the attenuation by AEC 408 and may be calculated using equation (3) above.

Processing may continue from action 520 to action 522, "Controlling the device to take one or more actions based at least in part on the AEC statistics." For example, a wake-word may be detected by a wake-word engine of local device 102. If accepted, a wake-word may cause all playback to pause and may cause local device 102 to listen for a command for a period of time. If rejected, the wake-word may have no effect and playback of audio by local device 102 may continue. AEC Statistics Engine 412 (depicted in FIG. 4) may determine that the wake-word is part of the playback of the audio stream AEC Statistics Engine 412 and should therefore be rejected based on the ERLE remaining above a predefined high threshold value, increasing at a rate that is above a threshold rate, and/or not experiencing a decline from a steady state condition. In such scenarios, it may be determined that a single talk (ST) condition is occurring based on the trends in the ERLE values. A single talk condition may occur when the audio detected by the microphone(s) of local device 102 closely matches the audio from the reference signal 490. Upon detection of the ST condition, AEC Statistics Engine 412 may set the wake-word accept/reject flag to "reject." Similarly, a strong cross correlation between input audio signal 492 and reference signal 490 may indicate a ST condition.

Conversely, in some other examples, a sharp decline in ERLE values and/or based on the ERLE values decreasing below a threshold ERLE level within a predefined amount of time may indicate a double talk (DT) condition detected by AEC Statistics Engine 412. A DT condition may occur when a user utterance of the wake-word is detected by one or more microphones of local device 102 in the presence of playback audio. In such an example, AEC 408 may be unable to cancel the user-uttered wake-word because the wake-word does not exist in the reference signal of the input audio source. Accordingly, the amount of attenuation may decline due to the inability of the AEC 408 to cancel the user-spoken wake-word. AEC Statistics Engine 412 may detect a double talk condition using, for example, the process described above along with one or more of Eqns. 1-14. In other examples, AEC Statistics Engine 412 may detect the DT condition based upon a sharp decline in a correlation between input audio signal 492 and reference signal 490. Upon detection of the DT condition, AEC Statistics Engine 412 may set the wake-word accept/reject flag to "accept." If a wake-word is detected while the wake-word accept/reject flag is set to "accept" playback of audio (e.g., playback 110 of FIG. 1) may be paused and/or attenuated and local device 102 may listen for a spoken command.

Figure 6:
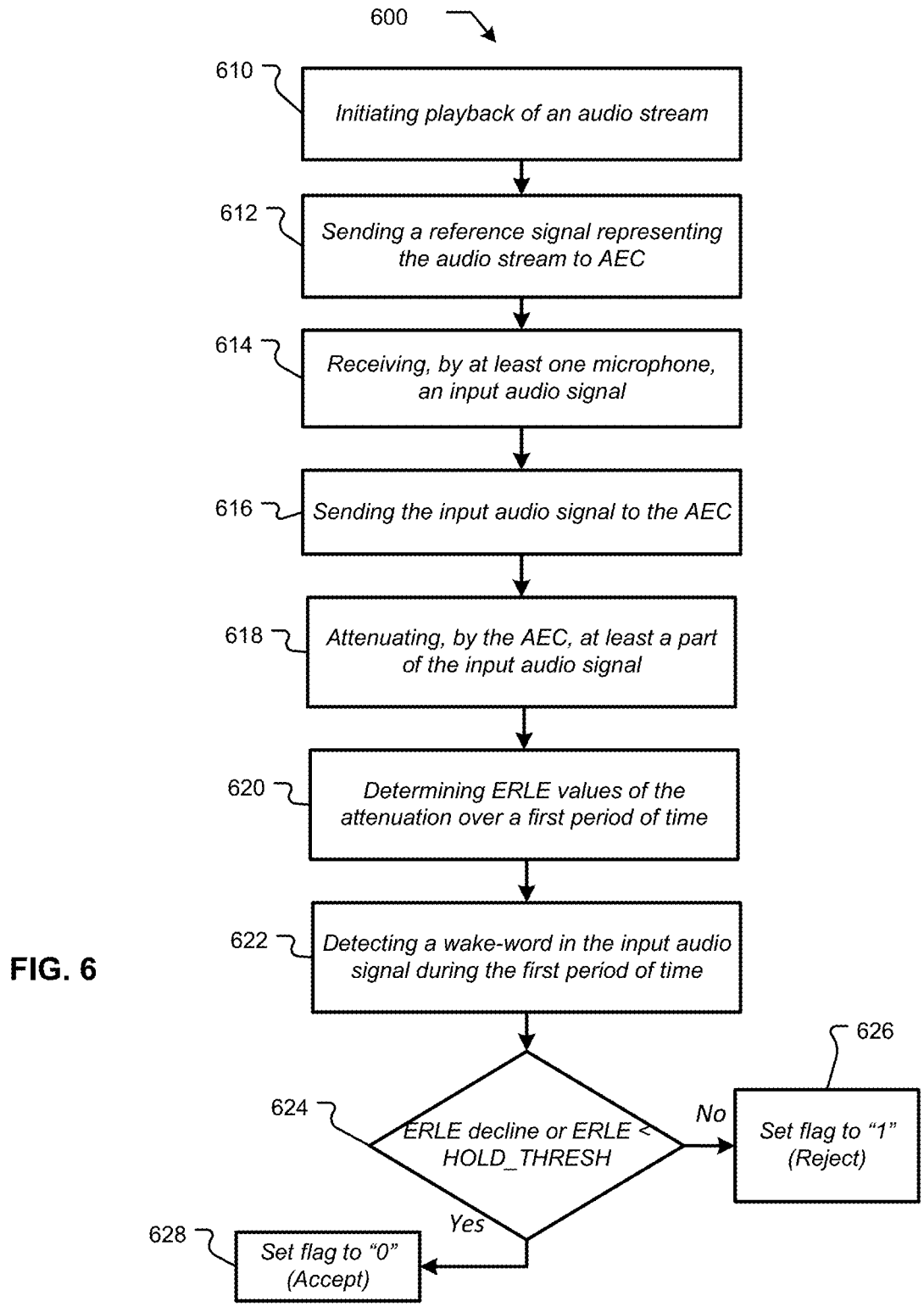
FIG. 6 depicts a flow chart showing an example process for wake-word false trigger prevention during audio playback, in accordance with various aspects of the present disclosure.

FIG. 6 is a flow chart showing an example process for wake-word false trigger prevention during audio playback, in accordance with various aspects of the present disclosure. The process flow 600 of FIG. 6 may be executed by local device 102 and/or by a combination of local device 102 and a computing device configured to be in communication with local device 102, in accordance with various aspects of the present disclosure. The actions of process flow 600 may represent a series of instructions comprising computer-readable machine code executable by a processing unit of a computing device or of local device 102. In various examples, the computer-readable machine code may be comprised of instructions selected from a native instruction set of the computing device and/or an operating system of the computing device. Various actions in process flow 600 may be described with reference to elements of FIGS. 1-5. Additionally, although the process flow 600 describes use of the AEC statistic ERLE for wake-word false trigger prevention during playback, other AEC statistics may be used in various other embodiments. Additionally, other actions of a voice-controlled device may be controlled as a result of a determination made using an AEC statistic, as described in the various embodiments of the present disclosure.

At action 610 of process flow 600, local device 102 may initiate playback of an audio stream. In various examples, local device 102 may detect a wake-word spoken by a user in the absence of audio playback. The user may thereafter issue a spoken command to local device 102. For example, after saying the wake-word and awakening local device 102, the user may say "Read chapter 2 of Of Mice and Men." Local device 102 may record the spoken command and may send the recorded audio over network 104 to one or more voice recognition servers 220. The voice recognition servers may analyze the received audio stream and may translate the audio stream into natural language. The one or more voice recognition servers 220 may determine whether or not the natural language corresponds to a command. If so, the one or more voice recognition servers 220 may send the command over network 104 to one or more other computing devices to execute the command. For example, a text to speech service may begin streaming an audio signal to local device 102 that, when played back, audibly "reads" the text of Chapter 2 of Of Mice and Men by John Steinbeck. The audio signal may be played back via a loudspeaker of local device 102 or may be played back by a loudspeaker that is configured in communication with local device 102.

Processing may continue from action 610 to action 612, "Sending a reference signal representing the audio stream to AEC." At action 612, the audio signal may be sent as a reference signal to an acoustic echo cancellation unit. For example, as shown in FIG. 4, the input audio signal may be equalized and sent as reference signal 490 to AEC 408. Additionally, although not depicted in FIG. 4, reference signal 490 may be sent to AEC 408. The reference signal may be compared to an input signal detected by one or more microphones of local device 102 to identify echo which may then be attenuated by AEC 408.

Processing may continue from action 612 to action 614, "Receiving, by at least one microphone an input audio signal." At action 614, at least one microphone of local device 102 may receive an input audio signal. The input audio signal may comprise any audible sound detected by one or more microphones of local device 102. In various examples, the audible sounds represented by the input audio signal may comprise speech spoken by a user of local device 102, background noise (e.g., traffic, a television, music playing elsewhere, ambient sounds), echo from the playback of the audio stream for which playback was initiated at action 610 or any other sound detectable by a microphone of local device 102.

Processing may continue from action 614 to action 616, "Sending the input audio signal to the AEC." At action 616, the input audio signal may be sent to AEC 408. AEC 408 may compare the input audio signal to the reference audio signal and may attenuate those parts of the input audio signal that match parts of the reference signal. Accordingly, echo, background noise and/or other sounds may not be translated into an actionable command on the audio signal input path of local device 102.

Processing may continue from action 616 to action 618, "Attenuating, by the AEC, at least a part of the input audio signal." At action 618, AEC 408 may attenuate parts of the input audio signal that match the reference signal. Accordingly, the attenuated parts of the input audio signal may not be translated into natural language and/or commands by local device 102 and/or by one or more voice recognition servers 220.

Processing may continue from action 618 to action 620, "Determining ERLE values of the attenuation over a first period of time." At action 620, local device 102 may determine the ERLE values of the attenuation over a first period of time. ERLE values may be a quantitative measure of the attenuation by AEC 408 and may be calculated using, for example, equation (3) above.

Processing may continue from action 620 to action 622, "Detecting a wake-word in the input audio signal during the first period of time." At action 622 a wake-word may be detected by a wake-word engine of local device 102. If accepted, a wake-word may cause all playback to pause or otherwise be attenuated and may cause local device 102 to listen for a command for a period of time. If rejected, the wake-word may have no effect and playback of audio by local device 102 may continue unattenuated.

At action 624, a determination may be made whether or not the ERLE values during the first period of time during which the wake-word was detected have either declined sharply or are less than a HOLD THRESH threshold value. The HOLD THRESH threshold value may be a low ERLE threshold value used to distinguish between a user utterance of a wake-word and a wake-word present in the playback stream. If the ERLE values during the first period of time have either declined sharply or are less than the HOLD THRESH value processing may proceed from action 624 to action 628 "Set flag to '0' (Accept)".

At action 628, the wake-word accept/reject flag may be set to "0" (e.g., "Accept") and the wake-word accept/reject flag may be sent to a wake-word engine of local device 102. The wake-word engine may determine that the wake-word was not a part of the downlink playback stream (e.g., the audio stream initiated at action 610) and was instead detected from a user utterance or other audible sound unaffiliated with the downlink playback stream. Accordingly, the wake-word engine may accept the wake-word and may pause or otherwise attenuate the playback audio stream initiated at action 610.

Conversely, if, at action 626, the ERLE values during the first period of time exhibit a positive trend (e.g., are increasing) or the ERLE values are converged and exceed a high threshold value (e.g., "THR2" above in equation (9)) processing may proceed from action 624 to action 626 "Set flag to '1' (Reject)".

At action 626, the wake-word accept/reject flag may be set to "1" (e.g., "Reject") and the wake-word accept/reject flag may be sent to a wake-word engine of local device 102. The wake-word engine may determine that the wake-word was a part of the downlink playback stream (e.g., the audio stream initiated at action 610) and that therefore the wake-word should be ignored without attenuating the playback audio stream initiated at action 610.

Among other potential benefits, a system in accordance with the present disclosure may allow an automatic speech recognition system to distinguish between sources of different signals. For example, a system in accordance with the present disclosure may distinguish between a user-spoken wake-word and a wake-word that is present in the downlink playback stream without using a computationally expensive second wake-word engine to detect wake-words directly in the playback stream (e.g., the downlink audio stream). Determining that a wake-word has occurred in the playback stream can be used to prevent an interruption in the playback and thus may avoid user inconvenience.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method to distinguish between a user-spoken wake-word and a wake-word present in playback by a voice-controlled computing device, the method comprising:
outputting audio via a loudspeaker of the voice-controlled computing device;
generating, by the voice-controlled computing device, a reference signal, wherein the reference signal comprises an equalized signal representative of the audio;
sending, by the voice-controlled computing device, the reference signal to an acoustic echo cancellation (AEC) unit;
detecting, by the voice-controlled computing device, an input signal, wherein the input signal comprises an echo of the audio, the input signal being generated by a microphone and an analog to digital converter of the voice-controlled computing device;
sending, by the voice-controlled computing device, the input signal to the AEC unit;
attenuating, by the AEC unit, at least a first portion of the input signal;
determining, by the voice-controlled computing device, a first set of echo return loss enhancement (ERLE) values for the first portion of the input signal over a first period of time;
detecting, by a wake-word engine, a presence of a wake-word in the input signal during the first period of time;
configuring, by the voice-controlled computing device, the wake-word engine to ignore the wake-word based on the first set of ERLE values over the first period of time; and
rejecting the wake-word by continuing to output the audio without pausing or attenuating the audio in response to the detection of the presence of the wake-word.

2. The method of claim 1, further comprising:
determining, by the voice-controlled computing device, a decline of a second set of ERLE values to below 10 dB during a second period of time between 5 ms and 50 ms following the first period of time;
configuring, by the voice-controlled computing device, the wake-word engine to accept the wake-word based on the second set of ERLE values over the second period of time;
detecting, by the wake-word engine, a second presence of the wake-word in the input signal during the second period of time; and
attenuating the playback of the audio based on the wake-word engine being configured to accept the wake-word.

3. The method of claim 2, further comprising:
determining, by the AEC unit, that a second portion of the input signal beginning at a first time stamp does not match a corresponding third portion of the reference signal beginning at the first time stamp, wherein the decline in the second set of ERLE values during the second period of time is caused at least in part by an inability of the AEC unit to cancel the second portion of the input signal.

4. A method of operating a computing device having a microphone, comprising:
outputting audio via a loudspeaker;
sending a reference signal representing the audio to an acoustic echo cancellation (AEC) unit of the computing device;
receiving, by the microphone, an input audio signal;
converting, by an analog to digital converter, the input audio signal to a digital input audio signal;
sending the digital input audio signal to the AEC unit;
attenuating, by the AEC unit, at least a part of the digital input audio signal;
determining AEC statistics related to the attenuation of at least the part of the digital input audio signal, wherein the AEC statistics comprise echo return loss enhancement (ERLE) values;
determining a first set of ERLE values over a first period of time;
detecting a presence of a wake-word in the digital input audio signal during the first period of time;
determining that the wake-word is not part of the audio output via the loudspeaker based at least in part on a decline in at least some ERLE values of the first set of ERLE values during the first period of time; and
attenuating the audio output via the loudspeaker based at least in part on the determination that the wake-word is not part of the audio output via the loudspeaker.

5. The method of claim 4, further comprising:
determining that an average ERLE value of the first set of ERLE values is above an ERLE threshold value during the first period of time; and
determining that the wake-word is part of the outputting of the audio based at least in part on the average ERLE value being above the ERLE threshold value.

6. The method of claim 4, wherein the loudspeaker comprises an external speaker, external to the computing device, and the AEC statistics comprise a correlation value related to a correlation between the digital input audio signal and an output signal of the audio, the method further comprising:
determining that the correlation value is below a low correlation threshold value; and
outputting the audio via an internal loudspeaker of the computing device.

7. The method of claim 4, further comprising:
determining a correlation value during the first period of time, wherein the correlation value represents a correlation between the digital input audio signal and an output signal of the audio; and
determining that the correlation value is below a threshold correlation value.

8. The method of claim 4, the method further comprising:
determining that the wake-word is not part of the audio based at least in part on a rate of the decline in at least some of the ERLE values of the first set of ERLE values during the first period of time.

9. The method of claim 4, further comprising:
identifying a first portion of the digital input audio signal; and
determining that the first portion of the digital input audio signal corresponds to a second portion of the reference signal based at least in part on the AEC statistics.

10. The method of claim 4, wherein the loudspeaker is a first loudspeaker and controlling the computing device to take the action based at least in part on the AEC statistics comprises outputting the audio via a second loudspeaker different from the first loudspeaker.

11. The method of claim 4, further comprising:
determining a correlation between the digital input audio signal and the reference signal;
determining that the loudspeaker is powered off based at least in part on the correlation; and
outputting the audio via a different loudspeaker.

12. The method of claim 4, wherein:
the attenuating, by the AEC unit, at least the part of the digital input audio signal comprises attenuating an echo from the audio outputted by the loudspeaker and received by the microphone.

13. A computing device comprising:
at least one processor;
a loudspeaker;
a microphone; and
a non-transitory, computer-readable memory configured in communication with the at least one processor, the memory effective to store instructions that when executed by the at least one processor cause the at least one processor to perform a method comprising:
outputting audio via the loudspeaker;
sending a reference signal representing the audio to an acoustic echo cancellation (AEC) unit of the computing device;
receiving, by the microphone, an input audio signal;
converting, by an analog to digital converter, the input audio signal to a digital input audio signal;
sending the digital input audio signal to the AEC unit;
attenuating, by the AEC unit, at least a part of the digital input audio signal;
determining AEC statistics related to the attenuation of at least the part of the digital input audio signal, wherein the AEC statistics comprise echo return loss enhancement (ERLE) values;
determining a first set of ERLE values over a first period of time;
detecting a presence of a wake-word in the digital input audio signal during the first period of time;
determining that the wake-word is not part of the audio output via the loudspeaker based at least in part on a decline in at least some ERLE values of the first set of ERLE values during the first period of time; and
attenuating the audio output via the loudspeaker based at least in part on the determination that the wake-word is not part of the audio output via the loudspeaker.

14. The computing device of claim 13, wherein the instructions when executed by the at least one processor cause the at least one processor to perform the method further comprising:
determining that an average ERLE value of the first set of ERLE values is above an ERLE threshold value during the first period of time; and
determining that the wake-word is part of the outputting of the audio based at least in part on the average ERLE value being above the ERLE threshold value.

15. The computing device of claim 13, wherein the loudspeaker comprises an external speaker, external to the computing device, and the AEC statistics comprise a correlation value related to a correlation between the digital input audio signal and an output signal of the audio, and wherein the instructions when executed by the at least one processor cause the at least one processor to perform the method further comprising:
determining that the correlation value is below a low correlation threshold value; and
wherein controlling the computing device to take the action comprises outputting the audio via an internal loudspeaker of the computing device.

16. The computing device of claim 13, wherein the instructions when executed by the at least one processor cause the at least one processor to perform the method further comprising:
determining a correlation value during the first period of time, wherein the correlation value represents a correlation between the digital input audio signal and an output signal of the audio; and
determining that the correlation value is below a threshold correlation value.

17. The computing device of claim 13, wherein the instructions when executed by the at least one processor cause the at least one processor to perform the method further comprising:
determining that the wake-word is not part of the audio based at least in part on a rate of the decline in at least some of the ERLE values of the first set of ERLE values during the first period of time.

18. The computing device of claim 13, wherein the instructions when executed by the at least one processor cause the at least one processor to perform the method further comprising:
identifying a first portion of the digital input audio signal; and
determining that the first portion of the digital input audio signal corresponds to a second portion of the reference signal based at least in part on the AEC statistics.

19. The computing device of claim 13, wherein the loudspeaker is a first loudspeaker and wherein the instructions when executed by the at least one processor cause the at least one processor to perform the method further comprising outputting the audio via a second loudspeaker different from the first loudspeaker.

* * * * *